United States Patent
Besier et al.

(10) Patent No.: US 10,363,913 B2
(45) Date of Patent: Jul. 30, 2019

(54) METHOD FOR OPERATING A BRAKE SYSTEM FOR MOTOR VEHICLES, AND A BRAKE SYSTEM

(71) Applicant: Continental Teves AG & Co. oHG, Frankfurt (DE)

(72) Inventors: Marco Besier, Bad Schwalbach (DE); Georg Roll, Frankfurt (DE); Stefan Drumm, Saulheim (DE); Paul Linhoff, Neu-Anspach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/693,600

(22) Filed: Sep. 1, 2017

(65) Prior Publication Data

US 2017/0361816 A1    Dec. 21, 2017

Related U.S. Application Data

(63) Continuation of application No. PCT/EP2016/054267, filed on Mar. 1, 2016.

(30) Foreign Application Priority Data

Mar. 2, 2015 (DE) .......... 10 2015 203 716
Feb. 26, 2016 (DE) .......... 10 2016 203 093

(51) Int. Cl.
  *B60T 8/88* (2006.01)
  *B60T 8/1755* (2006.01)
  (Continued)

(52) U.S. Cl.
  CPC ............ *B60T 8/885* (2013.01); *B60T 8/1755* (2013.01); *B60T 8/1761* (2013.01);
  (Continued)

(58) Field of Classification Search
  CPC ...... B60T 8/885; B60T 13/741; B60T 13/746; B60T 8/1761; B60T 8/1766;
  (Continued)

(56) References Cited

U.S. PATENT DOCUMENTS

| 5,139,315 A | 8/1992 | Walenty et al. |
| 8,746,809 B2 * | 6/2014 | Tachiiri ................ B60T 7/12 188/156 |

(Continued)

FOREIGN PATENT DOCUMENTS

| DE | 102011076980 A1 * | 12/2012 | ............ B60T 8/26 |
| DE | 102011076980 A1 | 12/2012 | |

(Continued)

OTHER PUBLICATIONS

International Search Report and Written Opinion dated May 6, 2016 from corresponding International Patent Application No. PCT/EP2016/054267.

(Continued)

*Primary Examiner* — Vishal R Sahni

(57) ABSTRACT

A method for operating a brake system of a motor vehicle, comprises a hydraulic operational brake device that has hydraulically-actuatable wheel brakes on at least one front axle of the motor vehicle, a parking brake device having wheel brakes on a rear axle of the motor vehicle, each of which can be actuated by means of an electromechanical actuator, and wheel speed sensors on the wheels of said front and rear axles. During braking by means of said hydraulic operational brake device while the vehicle is travelling, braking is carried out by said parking brake device.

17 Claims, 3 Drawing Sheets

(51) Int. Cl.
 B60T 8/1761 (2006.01)
 B60T 8/1766 (2006.01)
 B60T 13/74 (2006.01)
(52) U.S. Cl.
 CPC ........ B60T 8/1766 (2013.01); B60T 8/17616 (2013.01); B60T 13/741 (2013.01); B60T 13/746 (2013.01); B60T 2201/16 (2013.01); B60T 2270/402 (2013.01)
(58) Field of Classification Search
 CPC ............. B60T 2270/402; B60T 8/1755; B60T 8/17616; B60T 2201/16
 USPC ...................... 303/165, 155, 3, 15, 186, 189
 See application file for complete search history.

(56) References Cited

U.S. PATENT DOCUMENTS

| | | | |
|---|---|---|---|
| 2002/0027386 A1 | 3/2002 | Yanaka et al. | |
| 2003/0018425 A1* | 1/2003 | Gronau | B60T 8/172 701/71 |
| 2007/0007817 A1* | 1/2007 | Nonaga | B60T 13/746 303/155 |
| 2008/0262687 A1* | 10/2008 | Fujita | B60T 7/12 701/70 |
| 2013/0138316 A1* | 5/2013 | Koyama | B60T 8/32 701/70 |
| 2013/0213746 A1* | 8/2013 | Poertzgen | B60T 7/042 188/72.6 |
| 2014/0151164 A1* | 6/2014 | Yokoyama | B60T 1/065 188/72.3 |
| 2014/0188362 A1* | 7/2014 | Kotake | B60T 13/741 701/70 |
| 2015/0019101 A1* | 1/2015 | Bajorat | B60T 7/085 701/71 |
| 2015/0145321 A1* | 5/2015 | Yuasa | B60T 13/662 303/3 |

FOREIGN PATENT DOCUMENTS

| | | |
|---|---|---|
| JP | 3619029 B2 | 2/2005 |
| KR | 1020100039642 A | 4/2010 |
| KR | 1020110063893 A | 6/2011 |
| KR | 1020130049291 A | 5/2013 |
| KR | 101462425 B1 | 12/2014 |

OTHER PUBLICATIONS

Chinese Office Action dated Dec. 26, 2018 for corresponding Chinese Patent Application No. 201680011855.1.

* cited by examiner

METHOD FOR OPERATING A BRAKE SYSTEM FOR MOTOR VEHICLES, AND A BRAKE SYSTEM

CROSS-REFERENCE TO RELATED APPLICATIONS

This application claims the benefit of PCT Application PCT/EP2016/054267, filed Mar. 1, 2016, which claims priority to German Application 10 2015 203 716.9, filed Mar. 3, 2015, and German Application 10 2016 203 093.0, filed Feb. 26, 2016. The disclosures of the above applications are incorporated herein by reference

TECHNICAL FIELD

The invention concerns a brake system as well as a method for operating the brake system.

BACKGROUND

There are known motor vehicles that comprise a hydraulic service brake system for the front and rear axles and a parking brake system with electromechanical parking brakes (EPB) on the wheels of the rear axle that can be activated by the driver by means of an EPB operator push button. An emergency braking function is also known in such brake systems, which has the effect that if the EPB operator push button is activated by the driver while driving, hydraulic braking is triggered by means of the service brake system in order to brake the vehicle with a preset deceleration. Said function is also known as a dynamic brake function (DBF). If the (hydraulic) dynamic brake function (DBF) is not available, the actuator dynamic brake function (ADBF) can be used as a fallback, with which the electric parking brakes (EPBs) on the rear axle are used for braking while travelling.

In the case of said known operating method, the front axle turns freely, i.e. is unbraked, and the rear axle is braked with the electric parking brakes. The known ADBF is only digitally activated or deactivated by the driver by operating the EPB operator push button, i.e. analog regulation of the provision of the clamping forces is not provided. In the case of a suitable operating command, the electric drives of the electromechanical parking brakes are energized in the clamping direction until a tendency to locking up of the EPB braked wheels can be detected. The energization is then reversed until the tendency to locking up no longer exists, in order to clamp again thereafter and to repeat said process cyclically. The rear wheels are thus braked by means of the electric parking brakes at the limit of stability thereof, i.e. with the maximum achievable deceleration effect.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The method is therefore based on control algorithms that respond to the slip of the EPB braked wheels. During this, the slip is determined by comparing the current wheel revolution rate with a reference revolution rate that is proportional to the speed of the vehicle (so-called (vehicle) reference speed). The known ADBF only uses the wheel revolution rate information of the front wheels to form the vehicle reference speed, because said wheels turn freely during braking with ADBF and thus have no slip themselves.

A method for operating a brake system for motor vehicles as well as such a brake system that increases safety during braking of the motor vehicle is provided. In particular in cases in which the hydraulic service brake device has partially failed or can only be operated in a hydraulic fallback operating mode, which is for example unboosted.

A method for operating a brake system as well as to provide a brake system that results in an improved braking effect and in doing so preserves vehicle stability.

A brake system of a motor vehicle comprises a hydraulic service brake device with hydraulically operated wheel brakes on at least one front axle of the motor vehicle, a parking brake device with wheel brakes on a rear axle of the motor vehicle, each actuated by an electromechanical actuator, and wheel revolution rate sensors on the wheels of the front and rear axles. Braking by means of the parking brake device is carried out during braking is by means of the hydraulic service brake device while the motor vehicle is travelling. Braking by means of the parking brake device on the wheels of the rear axle is thus carried out during travel in parallel with braking on at least the wheels of the front axle by means of the hydraulic service brake device. Thus, an improved braking effect is achieved, wherein the vehicle remains stable.

This may be carried out during automated driving.

The method may be carried out if braking by means of a primary brake system of the hydraulic service brake device is not possible, and braking is carried out by means of a secondary brake system of the hydraulic service brake device on at least the front axle. Particularly, the primary brake system of the hydraulic service brake device comprises an electrically actuated first pressure supply device, with which the hydraulically operated wheel brakes of the front and rear axles can be actuated. Particularly, the secondary brake system of the hydraulic service brake device comprises an electrically actuated second pressure supply device, with which at least the hydraulically operated wheel brakes of the front axle can be actuated.

Braking by means of the parking brake device may be carried out based on an analysis or a comparison of the wheel revolution rate information of the wheels on the same side of the front axle and the rear axle. Thus, the braking effect on the front axle can be adequately taken into account for braking by means of the parking brake device on the rear axle.

For braking one of the wheels of the rear axle by means of the parking brake device, the wheel revolution rate information of said wheel (of the rear axle) and of the laterally associated wheel of the front axle (i.e. on the same side) can be used or analyzed. Each wheel of the rear axle is braked in this way by means of the parking brake device. Particularly, for braking one of the wheels of the rear axle by means of the parking brake device, only the wheel revolution rate information of said wheel (of the rear axle) and of the laterally associated wheel of the front axle is used or analyzed if there is no anti-lock control on the front axle.

According to an embodiment, the parking brake device is actuated or controlled so that the slip of at least one of the wheels of the rear axle is essentially adjusted in proportion to the slip of the laterally associated wheel of the front axle. Each wheel of the rear axle is braked in this way by means of the parking brake device. The parking brake device is actuated or controlled in this way if there is no anti-lock control on the front axle.

The parking brake device is actuated or controlled such that the wheels of the rear axle are essentially in slip corresponding to the wheels of the front axle, and/or such that each wheel of the rear axle is essentially in slip corresponding to the laterally associated wheel of the front axle. The parking brake device is particularly actuated or controlled in this way if there is no anti-lock control on the front axle.

According to another embodiment of the invention, the parking brake device is actuated or controlled such that at least the wheel revolution rate of one of the wheels of the rear axle is maintained essentially proportional to that of the laterally associated wheel of the front axle. Advantageously, each wheel of the rear axle is braked in this way by means of the parking brake device. The parking brake device is actuated or controlled in this way if there is no anti-lock control on the front axle. By controlling the wheel revolution rate of a rear wheel to a value proportional to the front wheel, it is achieved that the slips of the front and rear wheels are also proportional. This has the desired effect that as long as the front wheel is not locked, the rear wheel can also be not locked.

According to another embodiment, the parking brake device is actuated or controlled such that the wheel speed of at least one of the wheels of the rear axle is varied with the wheel speed of the laterally associated wheel of the front axle. Thus, oscillatory generation of a rear wheel brake force is achieved that is similar in the time average thereof and continuously proportional to the front wheel on the same side. Each wheel of the rear axle is braked in this way by means of the parking brake device. The parking brake device is actuated or controlled in this way if there is no anti-lock control on the front axle. Said embodiment gives the advantage that the method can be carried out with known electric parking brakes or electromechanical actuators of a parking brake device, which usually comprise no sensor arrangement (such as force, displacement or angle sensors), because the actuation of the parking brake device is carried out using the wheel revolution rate information of the laterally associated wheels.

The parking brake device is actuated or controlled such that the wheel speed of at least one of the wheels of the rear axle is varied with the wheel speed of the laterally associated wheel of the front axle within a predetermined speed range. Each wheel of the rear axle is braked in this way by means of the parking brake device. The parking brake device is actuated or controlled in this way if there is no anti-lock control on the front axle.

The predetermined speed range lies about the wheel speed of the corresponding front wheel with a predetermined spread. The predetermined spread is approximately plus 0.5 km/h and minus 0.5 km/h about the wheel speed of the front wheel on the same side.

For at least one of the wheels of the rear axle, a target wheel speed is predetermined and then set, being equal to a measured wheel speed of the laterally associated wheel of the front axle minus a target slip value. A corresponding target wheel speed is predetermined for each wheel of the rear axle. In this case, the target slip value is rear wheel-specific.

The target slip value is selected to be equal to an actual slip value of the front wheel on the same side multiplied by a predetermined scaling factor.

Because the corresponding setting of the wheel speed of the rear wheel may require some time, the wheel speed of the rear wheel is varied with the wheel speed of the laterally associated front wheel at least after an adjustment time interval.

The "laterally associated wheel of the front axle" means the wheel of the front axle on the same side. I.e., for example for the right rear wheel, the right front wheel is the laterally associated wheel of the front axle.

The aforementioned side-related analysis of the rear wheel and the front wheel, in particular the variation of the rear wheel speed with the wheel speed of the front wheel on the same side, has the advantage compared to the use of an equal target wheel speed for the rear wheels for both sides that the different wheel revolution rates occurring when cornering, even with no longitudinal slip, are adequately taken into account.

An exact determination of the two rear axle target wheel revolution rates from the two wheel revolution rates of the freely turning wheels of the front axle is described in EP 1153814 A1. The dependencies of the wheel revolution rates of all wheels of the vehicle when cornering that are stated therein could also be used for the control concept of setting the slip of the rear wheel so that it coincides with the slip of the front wheel on the same side of the vehicle. However, as has now been shown, it is sufficient for the method to vary the wheel revolution rates on the rear axle with the front axle according to the side.

According to another embodiment, the braking of at least one of the wheels of the rear axle is carried out by means of the parking brake device using a vehicle reference speed that is determined from the wheel revolution rate information of all wheels of the front and rear axles if there is anti-lock control on the front axle. Thus, the strong fluctuations of the front wheel revolution rates occurring during anti-lock control on the front axle are incorporated less into the control of the parking brake device. Each wheel of the rear axle is braked in this way by means of the parking brake device. Said manner of braking of the rear wheel is exclusively carried out by means of the parking brake device using the vehicle reference speed if there is anti-lock control on the front axle.

In the case of anti-lock control on the front axle, the slip thresholds for anti-lock control on the rear axle are set to a positive value in proportion to the vehicle reference speed. The slip thresholds are set to a value of approx. 3% to 6% of the vehicle reference speed.

According to another embodiment, brake force generation on the rear axle is carried out similarly in the time average thereof and continuously variably using the electric parking brake actuators.

The invention also concerns a brake system for a motor vehicle with a hydraulic service brake device with hydraulically operated wheel brakes on at least one front axle, a parking brake device with wheel brakes on a rear axle, each actuated by an electromechanical actuator, wheel revolution rate sensors on the wheels of the front and rear axles and an electronic control and regulating unit, wherein a method is carried out in the electronic control and regulating unit.

A brake system that can be actuated in a "brake-by-wire" operating mode both by the driver of the vehicle as well as independently of the driver of the vehicle, and in a hydraulic fallback mode can only be operated by the driver of the vehicle.

The hydraulic service brake device of the brake system comprises a primary brake system and a secondary brake system. The primary brake system of the hydraulic service brake device comprises an electrically actuated first pressure supply device, with which the hydraulically operated wheel brakes of the front and rear axles can be actuated. The secondary brake system of the hydraulic service brake device comprises an electrically actuated second pressure supply device, with which at least the hydraulically operated wheel brakes of the front axle can be actuated.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
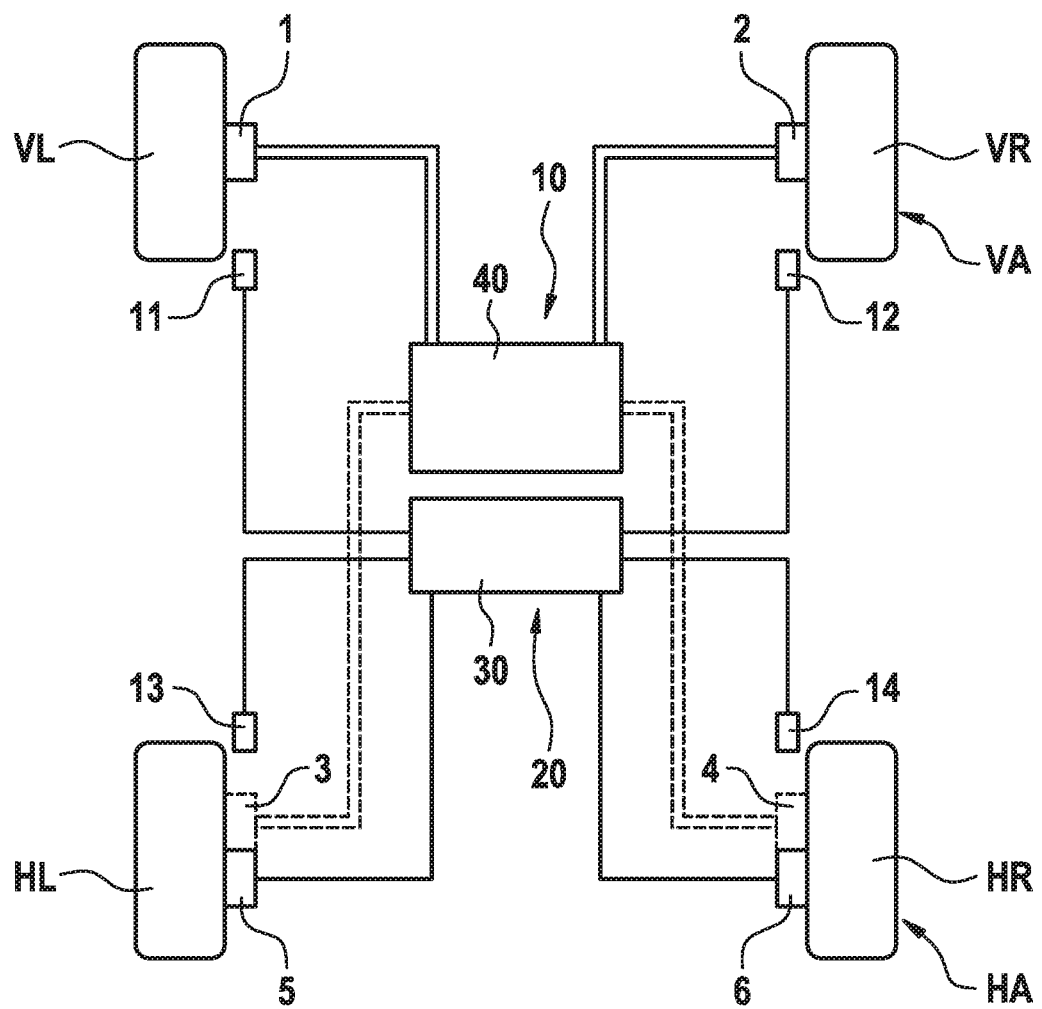
FIG. 1 shows an example of a brake system for carrying out a method according to the invention.

In FIG. 1, an example of a brake system of a motor vehicle for carrying out a method according to the invention is represented highly schematically. The motor vehicle comprises a front axle VA with a left front wheel VL and a right front wheel VR and a rear axle HA with a left rear wheel HL and a right rear wheel HR. The brake system comprises a hydraulic service brake device 10 as well as an electric parking brake device 20. Each wheel VR, VL, HR, HL is provided with a wheel revolution rate sensor 11, 12, 13, 14 that detects the wheel revolution rate of the corresponding wheel or a different variable representing the wheel revolution rate. Wheel-specific wheel revolution rate sensors are present in customary brake systems with anti-lock control functionality.

The service brake device 10 comprises hydraulically actuated wheel brakes at least for the front axle VA. According to the example, a hydraulically actuated wheel brake 1 is provided for the left front wheel VL and a hydraulically actuated wheel brake 2 is provided for the right front wheel VR. Optionally, a hydraulically actuated wheel brake 3 can be provided for the left rear wheel HL and a hydraulically actuated wheel brake 4 can be provided for the right rear wheel HR, which is indicated by the dashed connections. The service brake device 10 further comprises a hydraulic control and regulating unit 40, which for example can comprise a brake pedal-operated master brake cylinder, an electrically controlled pressure source for a "brake-by-wire" operating mode, a simulation device that works in conjunction with the master brake cylinder to generate a brake pedal feel in the "brake-by-wire" operating mode and electrically actuated valves, for example pressure control valves for setting wheel brake pressures on the wheel brakes 1-4.

The parking brake device 20 comprises electrically actuated wheel brakes for the rear axle HA. according to the example, a wheel brake 5 for the left rear wheel HL and a wheel brake 6 for the right rear wheel HR are provided. Each of the electrically actuated wheel brakes comprises an electromechanical actuator that is not represented in detail and by which it is actuated.

The wheel brakes 5, 6 of the parking brake device 20 can also be combined with the hydraulic wheel brakes 3, 4 of the rear axle of the service brake device in a unit, for example a so-called electromechanically driven combination brake caliper. Electric parking brakes (EPBs) are known that act on the service brake to produce a suitable braking effect, in particular for the parking brake function. In the case of an electromechanically driven combination brake caliper, for example a rotation-translation gearbox (for example a spindle drive or ball screw drive) is driven by an electric motor via a primary gearbox (mainly a rotation-rotation gearbox), which exerts an axial force on the brake piston in the brake caliper. With said force on the brake piston, the brake linings of the brake caliper are pressed onto the brake disk and thereby produce a clamping force.

Furthermore, the brake system comprises an electronic control and regulating unit 30. Said unit is used to actuate the electrically actuated components of the hydraulic service brake device 10 and the parking brake device 20. According to the example, the signals of the wheel revolution rate sensors 11, 12, 13, 14 are fed to the electronic control and regulating unit 30 and are analyzed in the electronic control and regulating unit 30 for carrying out a method according to the invention.

According to the example, while the motor vehicle is travelling braking is carried out by means of the parking brake device 20 on the rear axle in parallel in time with braking by means of the hydraulic service brake device 10 on at least the front axle VA. During this, the braking by means of the parking brake device 10 on the rear axle wheel brakes 5, 6 is carried out in each case depending on the difference of an actual wheel speed (or actual wheel revolution rate) and a target wheel speed (or target wheel revolution rate) of a rear wheel, wherein the target wheel speed of the rear wheel is determined from the actual wheel speed of the laterally associated front wheel (for example being measured by means of a wheel revolution rate sensor).

The exemplary operating method for the electric parking brakes (EPB) 5, 6 during dynamic braking is suitable for use in parallel with a likewise braked front axle VA. This enables the use of the EPBs 5, 6 to implement braking of the rear axle HA, for example in parallel with a hydraulically braked front axle VA.

Likewise, the exemplary operating method for electric parking brakes 5, 6 is suitable for assisting hydraulic braking acting on both axles VA, HA (front and rear axles). This is used for example to assist unboosted, driver-operated braking by means of the hydraulic service brake device 10 and thereby to increase the total braking effect for the same actuation effort of the driver.

In order to implement braking of the rear axle in parallel with a hydraulically braked front axle, the operation method according to the example works with a suitable analysis of the wheel revolution rate information and suitable actuation of the EPB actuators. This advantageously enables the generation of a rear axle brake force that is similar in the time average thereof and continuously variable using the electric parking brake actuators.

The method gives the advantage that it can be carried out with known electric parking brakes. Known electromechanical EPB actuators usually have no sensor arrangement, such as for example force, displacement or angle sensors, because this is adequate for operation as an electric parking brake in the state for which said actuators are designed. For the use of electric parking brake actuators while travelling, detection of the current brake force or clamping force would be necessary if the braking effect per control signal is to be adjusted similarly (in the sense of continuously) and reproducibly. For cost reasons, this is not implemented, however. In order to enable the use of the EPB actuators for dynamic braking while travelling, the wheel revolution rate information that is already normally available in the vehicle is used.

An exemplary method for operating a brake system with a hydraulic service brake device 10 with hydraulically operated wheel brakes 1, 2 on at least the front axle VA and a parking brake device 20 with wheel brakes 5, 6 on the rear axle HA, each actuated by an electromechanical actuator, is carried out as follows:

If the front axle VA is hydraulically braked, there is corresponding wheel slip on the front axle VA. As long as there is no anti-lock control, the wheel slip is however still within the stable wheel slip range. According to the example, the wheel speeds of the rear wheels HL, HR are controlled to target wheel revolution rates, which are calculated from the measured actual front wheel revolution rates, using braking by the EPB actuators 5, 6. For this purpose, the wheel revolution rate information is observed side-specifically. I.e., to control the braking effect of the left rear wheel HL, the wheel revolution rate information thereof is controlled in relation to the wheel revolution rate information of the left front wheel VL. This is also carried out correspondingly on the right side.

The basis for a target rear wheel revolution rate is the wheel revolution rate of the front wheel on the same side of the vehicle. A target slip value is subtracted from said base wheel revolution rate. As the target slip value for the rear wheel, an actual slip value of the front wheel on the same side that is scaled with a preselected proportionality factor can be used. The actual slip value can be the result of a wheel slip estimation of the ABS control algorithm. If the difference of the actual and target slip values exceeds an upper threshold value or is below a lower threshold value, a counteracting intervention is carried out—in the case of the EPBs a reversal of the actuator energization.

The target rear wheel revolution rate is thus equal to the actual front wheel revolution rate (on the same side) minus the target slip.

The thresholds preferably correspond to +0.5 km/h and −0.5 km/h.

Figure 2:
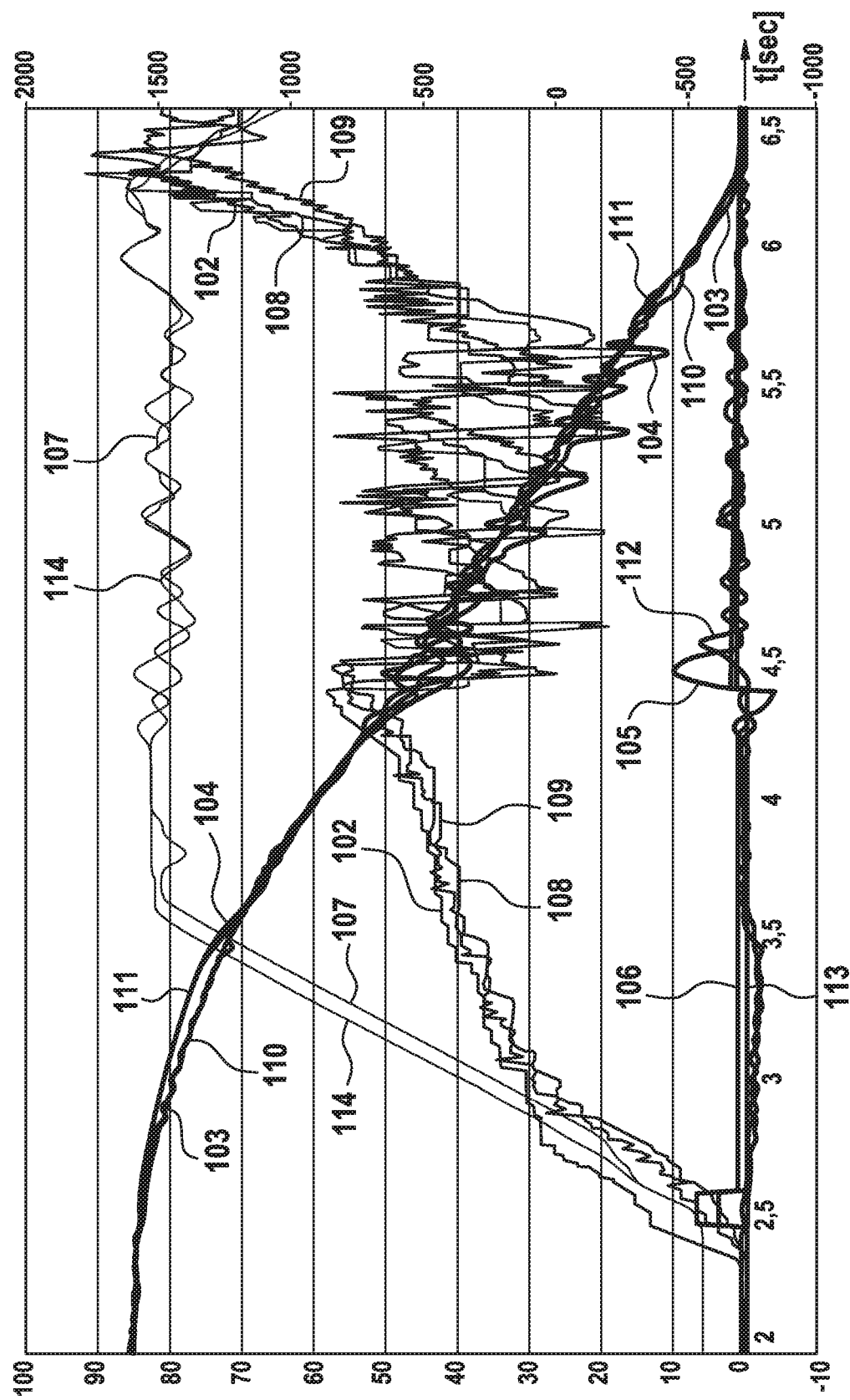
FIG. 2 shows a first example of a time profile of different variables during an example of an exemplary method for operating a brake system.

In FIG. 2, a first example of a time profile of different variables during an example of a method for operating a brake system is represented. FIG. 2 illustrates braking up to anti-lock control.

Figure 3:
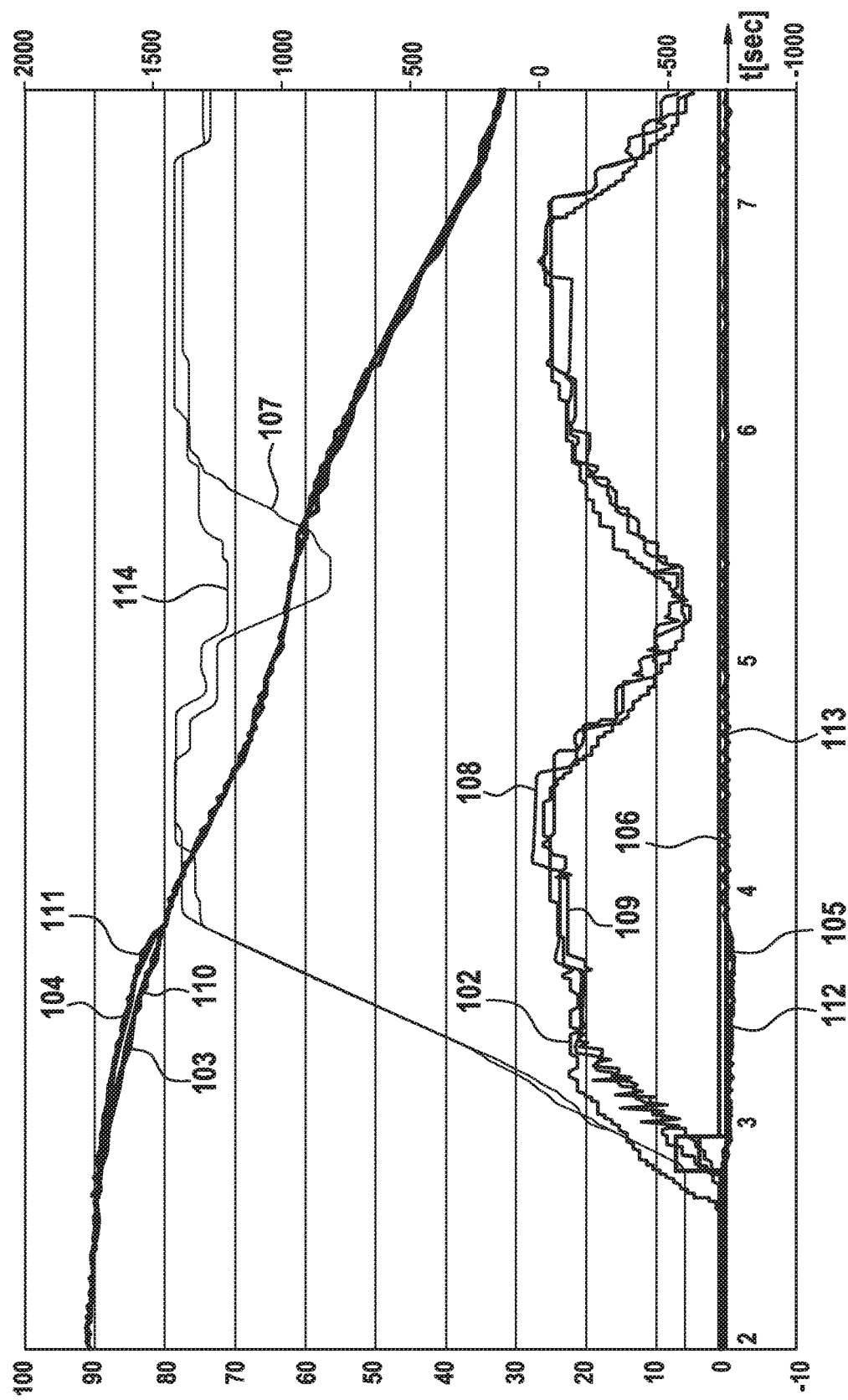
FIG. 3 shows a second example of a time profile of different variables during an example of an exemplary method for operating a brake system.

In FIG. 3, a second example of a time profile of different variables during an example of a method for operating a brake system is represented. FIG. 3 illustrates braking in the case of slow up and down modulation of the target pressure or the braking demand.

In FIGS. 2 and 3, the following variables are represented as functions of the time t in seconds (sec): the target wheel pressure of the left front wheel VL in bar (line 101, lies below line 102 in the fig.), target wheel pressure of the right front wheel VR in bar (line 102), wheel pressure of the left front wheel VL in bar (line 108), wheel pressure of the right front wheel VR in bar (line 109), wheel speed of the left front wheel VL in km/h (line 103), wheel speed of the left rear wheel HL in km/h (line 104), wheel speed of the right front wheel VR in km/h (line 110), wheel speed of the right rear wheel HR in km/h (line 111), slip of the left rear wheel HL in km/h (line 105), slip of the right rear wheel HR in km/h (line 112), upper slip threshold in km/h (line 106), lower slip threshold in km/h (line 113), signal corresponding to the tightening and clamping travel (of the operation) of the EPB actuator 5 of the left rear wheel HL in μm (line 107), signal corresponding to the tightening and clamping travel (of the operation) of the EPB actuator 6 of the right rear wheel HR in μm (line 114).

As can be seen from FIG. 2, the rear wheel speeds 104, 111 are reduced to the corresponding front wheel speeds 103, 110 (approx. t=2.7 sec to approx. t=3.5 sec) by the exemplary method once the EPB actuators 5, 6 have overcome the air gap and a clamping force has built up. From about t=3.5 sec to about t=4.2 sec, the rear wheel speeds 104, 111 run about the same as the front wheel speeds 103, 110.

According to the example, the rear wheel speeds are varied with the front wheel speeds 103, 110 using the upper threshold 106 of +0.5 km/h and the lower threshold 113 of −0.5 km/h.

In the case of braking of the front axle VA, the front wheels VL, VR enter slip according to the applied clamping force of the hydraulic front wheel brakes 1, 2 compared to the real speed of the vehicle over the ground. The example of control of the rear wheel speeds 104, 111 by analysis of the wheel revolution rate information of the front and rear wheels (in particular the front and rear wheels per side of the vehicle) results as desired in the rear wheels running into slip equally with the front wheels (or each rear wheel runs equally into slip as the side-specifically corresponding front wheel) and there is thus a braking effect on the rear wheels HL, HR, the relationship of which to the braking effect of the front wheels VL, VR corresponds to the ideal brake force distribution.

Before anti-lock control occurs (at approx. t=4.4 sec), the front and rear wheels are in the stable wheel slip range.

Once anti-lock control is necessary (in particular on the front axle VA) because of a braking demand (for example by the driver) that results in exceeding the stable wheel slip range, according to the example the slip threshold and/or the wheel revolution rate analysis for the operation method are changed. The slip threshold and/or the wheel revolution rate analysis are preferably changed such that the rear axle itself also produces a stable and high braking effect during anti-lock control of the front axle VA.

In this case, the wheel revolution rate analysis advantageously examines a vehicle reference speed that is calculated based on wheel speed information for all four wheels (103, 104, 110, 111). This is advantageous during anti-lock control, because in this case the front wheels VL, VR always return to the unstable wheel slip range and thus said wheel speeds 103, 110 fluctuate strongly or run cyclically deeper into slip according to the wheel brake clamping force modulation.

Moreover, during anti-lock control, according to the example the slip threshold (106, 113) for the rear wheels varies compared to the state of braking in the stable wheel slip range. The slip thresholds are in this case both set to a positive value in proportion to the vehicle reference speed. Said thresholds are preferably then approx. 3-6% of the calculated vehicle reference speed. The change of the slip thresholds during anti-lock control advantageously results in the rear axle itself also producing a stable and high braking effect close to the limit of wheel slip stability during anti-lock control of the front axle.

As can be seen from FIG. 3, the rear wheel speeds 104, 111 are reduced by the exemplary method to the corresponding front wheel speeds 103, 110 once the EPB actuators have overcome the air gap, approx. at t=3.8 sec, and a clamping force builds up.

According to the example, the rear wheel speeds are varied with the front wheel speeds using the thresholds 106, 113 of +0.5 km/h and −0.5 km/h.

Approximately between t=4 sec and t=6 sec, it can be seen from FIG. 3 how the wheel brakes 5, 6 on the rear wheels control the clamping force or brake force (in proportion to the front wheels) according to demand and corresponding to the braking demand (which is reflected by the target wheel pressures 101, 102) by the exemplary operating method. This can easily be seen from the wheel speeds of the rear wheels 104, 111 in comparison to the wheel speeds of the front wheels 103, 110. The signals 107, 114 of the clamping travels of the EPB actuators 5, 6 of the rear wheels show how the EPB actuators tighten and clamp to set the desired brake force.

An operating method is also used for the case in which both vehicle axles are already being hydraulically braked. Thus for example, unboosted hydraulic driver-operated braking can be boosted and thereby the total braking effect can be increased for the same actuation effort by the driver.

With the exemplary operating method for electric parking brakes during dynamic braking, boosting or use in parallel with hydraulic braking while travelling is possible. In this case, the vehicle stability is advantageously maintained by suitable control of the electric parking brake actuators based on the wheel revolution rate information.

The exemplary control of the rear wheel speeds by the analysis of the wheel revolution rate information of the front and rear wheels described above in detail advantageously results in the rear wheels running into slip equally with the front wheels. Thus, slip of the rear wheels advantageously arises in proportion to that of the front wheels.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating a brake system of a motor vehicle having wheels, wheel brakes and front and rear axles, the method comprising:
    providing a hydraulic service brake device with hydraulically operated wheel brakes on at least one front axle of the motor vehicle;
    providing a parking brake device with wheel brakes and operating each with an electromechanical actuator on a rear axle of the motor vehicle;
    measuring wheel revolutions with wheel revolution rate sensors on the wheels of the front and rear axles; and
    braking with the parking brake device during braking by the hydraulic service brake device while the motor vehicle is travelling;
    wherein braking by the parking brake device is carried out based on one of: an analysis and comparison of a wheel revolution rate information of the wheels on the same side of the front and rear axles.

2. The method of claim 1, wherein the parking brake device is one of actuated and controlled such that slip of at least one of the wheels of the rear axle is adjusted in proportion to slip of a laterally associated wheel of the front axle.

3. The method of claim 1, wherein the parking brake device is one of actuated and controlled such that wheel speed of at least one of the wheels of the rear axle is varied with wheel speed of a laterally associated wheel of the front axle.

4. The method of claim 1, wherein the parking brake device is one of actuated and controlled such that wheel speed of at least one of the wheels of the rear axle is varied with wheel speed of a laterally associated wheel of the front axle within a predetermined speed range.

5. The method of claim 4, wherein the predetermined speed range lies about the wheel speed of the laterally associated wheel with a predetermined spread.

6. The method of claim 1, wherein a target wheel speed for at least one of the wheels of the rear axle is predetermined and adjusted equal to a measured wheel speed of the laterally associated wheel of the front axle minus a target slip value.

7. The method of claim 6, wherein the target slip value is equal to an actual slip value of the front wheel on the same side multiplied by a predetermined scaling factor.

8. The method of claim 1, wherein there is no anti-lock control on the front axle.

9. The method of claim 1, wherein the braking of at least one of the wheels of the rear axle is carried out by the parking brake device using a vehicle reference speed, which is determined from the wheel revolution rate information of all wheels of the front and rear axles when there is anti-lock control on the front axle.

10. The method of claim 1, wherein the case of anti-lock control on the front axle, the slip thresholds for anti-lock control on the rear axle are set to a positive value in proportion to a vehicle reference speed.

11. The method of claim 10, wherein the slip thresholds are set to a value of approx. 3% to 6% of the vehicle reference speed.

12. A brake system for a motor vehicle having wheels, wheel brakes, axles and with a hydraulic service brake device, the brake system comprising:
    a plurality of hydraulically operated wheel brakes on at least one front axle,
    a parking brake device with wheel brakes on a rear axle, each actuated by an electromechanical actuator,
    a plurality of wheel revolution rate sensors on the wheels of the front and rear axles and
    an electronic control and regulating unit wherein the braking is carried out in the electronic control and regulating unit;
    wherein braking by the parking brake device is carried out based on one of: an analysis and comparison of a wheel revolution rate information of the wheels on the same side of the front and rear axles.

13. The brake system of claim 12, wherein the parking brake device is one of actuated and controlled such that slip of at least one of the wheels of the rear axle is adjusted in proportion to slip of a laterally associated wheel of the front axle.

14. The brake system of claim 12, wherein the parking brake device is one of actuated and controlled such that wheel speed of at least one of the wheels of the rear axle is varied with wheel speed of the laterally associated wheel of the front axle.

15. The brake system of claim 12, wherein the parking brake device is one of actuated and controlled such that wheel speed of at least one of the wheels of the rear axle is varied with wheel speed of a laterally associated wheel of the front axle within a predetermined speed range.

16. The brake system of claim 15, wherein the predetermined speed range lies about the wheel speed of the laterally associated wheel with a predetermined spread.

17. The brake system of claim 12, wherein a target wheel speed for at least one of the wheels of the rear axle is predetermined and adjusted equal to a measured wheel speed of a laterally associated wheel of the front axle minus a target slip value.

* * * * *